United States Patent
Löhr et al.

(10) Patent No.: US 11,540,205 B2
(45) Date of Patent: Dec. 27, 2022

(54) METHOD AND APPARATUS FOR APPLYING A CELL RESTRICTION CONFIGURATION

(71) Applicant: Lenovo (Singapore) Pte. Ltd., New Tech Park (SG)

(72) Inventors: Joachim Löhr, Wiesbaden (DE); Prateek Basu Mallick, Langen (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 79 days.

(21) Appl. No.: 16/531,656

(22) Filed: Aug. 5, 2019

(65) Prior Publication Data

US 2020/0053632 A1 Feb. 13, 2020

Related U.S. Application Data

(60) Provisional application No. 62/716,324, filed on Aug. 8, 2018.

(51) Int. Cl.
  *H04W 48/08* (2009.01)
  *H04W 92/10* (2009.01)

(52) U.S. Cl.
  CPC ............ *H04W 48/08* (2013.01); *H04W 92/10* (2013.01)

(58) Field of Classification Search
  CPC .................................................. H04W 48/08
  See application file for complete search history.

(56) References Cited

U.S. PATENT DOCUMENTS

| 2018/0279168 | A1* | 9/2018 | Jheng | H04W 28/04 |
| 2018/0368132 | A1* | 12/2018 | Babaei | H04W 80/02 |
| 2019/0053325 | A1* | 2/2019 | Yu | H04W 76/32 |
| 2019/0253926 | A1* | 8/2019 | Kim | H04W 28/0278 |
| 2021/0297931 | A1* | 9/2021 | Zhang | H04W 48/20 |

FOREIGN PATENT DOCUMENTS

| WO | 2019160327 A1 | 8/2019 | |
| WO | WO 2020024847 A1 * | 2/2020 | H04W 76/30 |

OTHER PUBLICATIONS

Garcia, PCT International Search Report, International Application No. PCT/IB2019/056700, European Patent Office, Rijswijk, NL, dated Dec. 9, 2019.

(Continued)

*Primary Examiner* — Chae S Lee
(74) *Attorney, Agent, or Firm* — Loppnow & Chapa; Matthew C. Loppnow (57) ABSTRACT

A duplication deactivated cell restriction configuration can be received at a UE. The duplication deactivated cell restriction configuration can be a cell restriction configuration a UE shall apply for at least one LCH of a DRB for which PDCP duplication is deactivated. The duplication deactivated cell restriction configuration can be received when at least one DRB is configured with PDCP duplication. The DRB for which duplication is deactivated can be a DRB of the at least one DRB configured with PDCP duplication. The duplication deactivated cell restriction configuration the UE shall apply can be applied for the at least one LCH of a DRB for which PDCP duplication is deactivated.

18 Claims, 7 Drawing Sheets

(56) References Cited

OTHER PUBLICATIONS

ERICSSON: "LCP restrictions for 1-19 duplication and non-duplication", 3GPP Draft; R2-1810180—LCP Restrictions for Duplication and Non-Duplication, 3rd Generation Partnership Project (3GPP), Mobile Competence Centre ; 650, Route Des Lucioles ; F-06921 Sophia-Antipolis, vol. RAN WG2, No. Montreal, Canada; Jul. 2, 2018-Jul. 6, 2018, Jul. 1, 2018 (Jul. 1, 2018).

Lenovo et al: "Cell restriction for CA duplication", 3GPP Draft; R2-1906724, 3rd Generation Partnership Project (3GPP), Mobile Competence Centre; 650, Route Des Lucioles ; F-06921 Sophia-Antipolis Cedex ; France vol. RAN WG2, No. Reno, USA; May 13, 2019-May 17, 2019, May 13, 2019 (May 13, 2019).

3GPP TS 38.321 V15.2.0, 3rd Generation Partnership Project; Technical Specification Group Radio Access Network; NR; Medium Access Control (MAC) protocol specification (Release 15), Sophia Antipolis Valbonne—France, Jun. 2018.

* cited by examiner

FIG. 1

```
-- ASN1START
-- TAG-LOGICAL-CHANNEL-CONFIG-START

LogicalChannelConfig ::=              SEQUENCE {
    ul-SpecificParameters             SEQUENCE {
        priority                          INTEGER (1..16),
        prioritisedBitRate                ENUMERATED {kBps0, kBps8, kBps16, kBps32, kBps64, kBps128,
kBps256, kBps512,                                   kBps1024, kBps2048, kBps4096, kBps8192, kBps16384, kBps32768,
kBps65536, infinity},
        bucketSizeDuration                ENUMERATED {ms5, ms10, ms20, ms50, ms100, ms150, ms300, ms500,
ms1000,                                             spare7, spare6, spare5, spare4, spare3, spare2,
spare1} ,
        allowedservingCells               SEQUENCE (SIZE (1..maxNrofServingCells-1)) OF ServCellIndex
        allowedSCS-List                   SEQUENCE (SIZE (1..maxSCSs) ) OF SubcarrierSpacing
        maxPUSCH-Duration                 ENUMERATED { ms0p02, ms0p04, ms0p0625, ms0p125, ms0p25 ms0p5,
spare2, spare1 }
        configuredGrantType1Allowed       ENUMERATED {true }
        logicalChannelGroup               INTEGER (0..maxLCG-ID)
        schedulingRequestID               SchedulingRequestId
        logicalChannelSR-Mask             BOOLEAN,
        logicalChannelSR-DelayTimerApplied BOOLEAN,
        ...
    }
    ...
}

-- TAG-LOGICAL-CHANNEL-CONFIG-STOP
-- ASN1STOP
```

```
-- ASN1START
-- TAG-LOGICAL-CHANNEL-CONFIG-START

LogicalChannelConfig ::=          SEQUENCE {
    ul-SpecificParameters         SEQUENCE {
        priority                      INTEGER (1..16),
        prioritisedBitRate            ENUMERATED {kBps0, kBps8, kBps16, kBps32, kBps64,
            kBps128, kBps256, kBps512,
            kBps1024, kBps2048, kBps4096, kBps8192, kBps16384,
            kBps32768, kBps65536, infinity},
        bucketSizeDuration            ENUMERATED {ms5, ms10, ms20, ms50, ms100, ms150,
            ms300, ms500, ms1000,                 spare7, spare6, spare5, spare4,
            spare3, spare2, spare1},
        AllowedServingCells           SEQUENCE (SIZE (1..maxNrofServingCells-1)) OF
                                      OPTIONAL,
        ServCellIndex
            AllowedServingCells-duplication  SEQUENCE (SIZE (1..maxNrofServingCells-1)) OF
                                      OPTIONAL,
        ServCellIndex
            allowedSCS-List           SEQUENCE (SIZE (1..maxSCSs)) OF SubcarrierSpacing
            maxPUSCH-Duration         ENUMERATED { ms0p02, ms0p04, ms0p0625, ms0p125,
        ms0p25, ms0p5, spare2, spare1 }
        configuredGrantType1Allowed   ENUMERATED {true}
        logicalChannelGroup           INTEGER (0..maxLCG-ID)
        schedulingRequestID           SchedulingRequestID
        logicalChannelSR-Mask         BOOLEAN,
        logicalChannelSR-DelayTimerApplied BOOLEAN,
        ...
    },
    ...
}

-- TAG-LOGICAL-CHANNEL-CONFIG-STOP
-- ASN1STOP
```

*FIG. 5*

```
moreThanOneRLC       SEQUENCE {
    primaryPath            SEQUENCE {
        cellGroup              cellGroupId                    OPTIONAL,         -- Need R
        logicalChannel         logicalChannelIdentity         OPTIONAL          -- Need R
    },
    ul-DataSplitThreshold      ul-DataSplitThreshold          OPTIONAL,         -- Cond SplitBearer
    pdcp-Duplication           BOOLEAN                        OPTIONAL          -- Need R
    continue-cellRestrictionafter-Duplication    BOOLEAN      OPTIONAL          -- Need R
}
```

METHOD AND APPARATUS FOR APPLYING A CELL RESTRICTION CONFIGURATION

BACKGROUND

1. Field

The present disclosure is directed to a method and apparatus for applying a cell restriction configuration.

2. Introduction

Presently, wireless communication devices, such as User Equipment (UE), communicate with other communication devices using wireless signals. The devices exchange information with each other using data packets. Packet Data Convergence Protocol (PDCP) duplication provides duplication of packets, where the same packet is duplicated across different cells/carriers, such as for diversity gain purposes, for Quality of Service (QoS) purposes, or for other reasons. When PDCP duplication was introduced for New Radio (NR) it was agreed that for the Carrier Aggregation (CA) duplication case, it should be ensured that the same Protocol Data Unit (PDU), such as an original PDU and a duplicate of the original PDU, should not be transmitted on the same carrier. This would benefit from the diversity gain from transmitting the PDUs on different carriers. Such cell restriction functionality for Logical Channels (LCHs) was later implemented in the Logical Channel Prioritization (LCP) procedure.

Higher layer signaling, such as Radio Resource Control (RRC) signaling, configures, for an LCH, a set of allowed serving cells that are the cells where data of an LCH can be transmitted on. Later on, it was agreed that the LCH-to-cell restriction functionality can be applied to any bearer, not only to duplication bearers.

For example, according to Technical Specification (TS) 36.321, 5.4.3.1 Logical channel prioritization
5.4.3.1.1 General
The Logical Channel Prioritization procedure is applied whenever a new transmission is performed.
RRC controls the scheduling of uplink data by signaling for each logical channel per Medium Access Control (MAC) entity:
  priority where an increasing priority value indicates a lower priority level;
  prioritisedBitRate which sets the Prioritized Bit Rate (PBR);
  bucketSizeDuration which sets the Bucket Size Duration (BSD).
RRC additionally controls the LCP procedure by configuring mapping restrictions for each logical channel:
  allow edSCS-List which sets the allowed Subcarrier Spacing(s) for transmission;
  maxPUSCH-Duration which sets the maximum Physical Uplink Shared Channel (PUSCH) duration allowed for transmission;
  configuredGrantType1Allowed which sets whether a configured grant Type 1 can be used for transmission;
  allow edServingCells which sets the allowed cell(s) for transmission.
The following UE variable is used for the Logical channel prioritization procedure:
  Bj which is maintained for each logical channel j.
The MAC entity shall initialize Bj of the logical channel to zero when the logical channel is established.

For each logical channel j, the MAC entity shall:
1>increment Bj by the product PBR×T before every instance of the LCP procedure,
  where T is the time elapsed since Bj was last incremented;
1>if the value of Bj is greater than the bucket size (i.e. PBR×BSD):
  2>set Bj to the bucket size.
NOTE: The exact moment(s) when the UE updates Bj between LCP procedures is up to UE implementation, as long as Bj is up to date at the time when a grant is processed by LCP.

5.4.3.1.2 Selection of Logical Channels
The MAC entity shall, when a new transmission is performed:
1>select the logical channels for each Uplink (UL) grant that satisfy all the following conditions:
  2>the set of allowed Subcarrier Spacing index values in allow edSCS-List, if configured, includes the Subcarrier Spacing index associated to the UL grant; and
  2>maxPUSCH-Duration, if configured, is larger than or equal to the PUSCH transmission duration associated to the UL grant; and
  2>configuredGrantType/Allowed, if configured, is set to TRUE in case the UL grant is a Configured Grant Type 1; and
  2>allow edServingCells, if configured, includes the Cell information associated to the UL grant.
NOTE: The Subcarrier Spacing index, PUSCH transmission duration and Cell information are included in Uplink transmission information received from lower layers for the corresponding scheduled uplink transmission.

PDCP duplication is activated and deactivated by using Medium Access Control Control Element (MAC CE) signaling. In a case where a network deactivates duplication for a bearer configured for duplication, the UE no longer applies the configured cell restriction, i.e. allowedServingCells, for the corresponding LCHs. Only when duplication is activated, does the UE apply the configured cell restriction, i.e. allowedServingCells, to the LCHs of the Data Radio Bearer (DRB). For example, 5.10 Activation/Deactivation of PDCP duplication
If one or more DRBs are configured with PDCP duplication, the network may activate and deactivate the PDCP duplication for the configured DRB(s).
The PDCP duplication for the configured DRB(s) is activated and deactivated by:
receiving the Duplication Activation/Deactivation MAC CE described in subclause 6.1.3.11.
The MAC entity shall for each DRB configured with PDCP duplication:
1>if a Duplication Activation/Deactivation MAC CE is received activating the PDCP duplication of the DRB:
  2>indicate the activation of PDCP duplication of the DRB to upper layers;
  2>apply the allowedServingCells to the logical channels of the DRB.
1>if a Duplication Activation/Deactivation MAC CE is received deactivating the PDCP duplication of the DRB:
  2>indicate the deactivation of PDCP duplication of the DRB to upper layers;
  2>not apply the allowedServingCells to the logical channels of the DRB.

Therefore, according to current specifications, it is not possible to restrict the LCHs of a duplication radio bearer for cases when duplication is deactivated.

Since UE will not apply the cell restriction configuration for the LCHs of a duplication bearer when duplication is deactivated as mentioned above, a base station, such as a gNB, would need to send a RRC reconfiguration message with a new cell restriction configuration to the UE every time PDCP duplication has been deactivated for a duplication bearer in order to ensure that the cell restriction is also applied by the UE for the deactivated duplication bearer. Since the activation/deactivation of duplication is considered as a dynamic operation, i.e. depending on channel conditions, a frequent RRC signaling is necessary which is very costly in terms of signaling overhead. This essentially defeats the benefits of the cell restriction functionality.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for applying a cell restriction configuration. For example, embodiments can provide for LCH-to-cell restriction for duplication bearers. According to a possible embodiment, a duplication deactivated cell restriction configuration can be received at a UE. The duplication deactivated cell restriction configuration can be a cell restriction configuration the UE shall apply for at least one LCH of a DRB for which PDCP duplication is deactivated. The duplication deactivated cell restriction configuration can be received when at least one DRB is configured with PDCP duplication. The DRB for which duplication is deactivated can be a DRB of the at least one DRB configured with PDCP duplication. The duplication deactivated cell restriction configuration the UE shall apply can be applied for the at least one LCH of a DRB for which PDCP duplication is deactivated.

According to another possible embodiment, at least one DRB can be configured for PDCP duplication. A duplication deactivated cell restriction configuration can be signaled. The duplication deactivated cell restriction configuration can be a cell restriction configuration a UE shall apply for at least one LCH of a DRB for which PDCP duplication is deactivated. The DRB for which duplication is deactivated can be a DRB of the at least one DRB configured with PDCP duplication.

Figure 1:
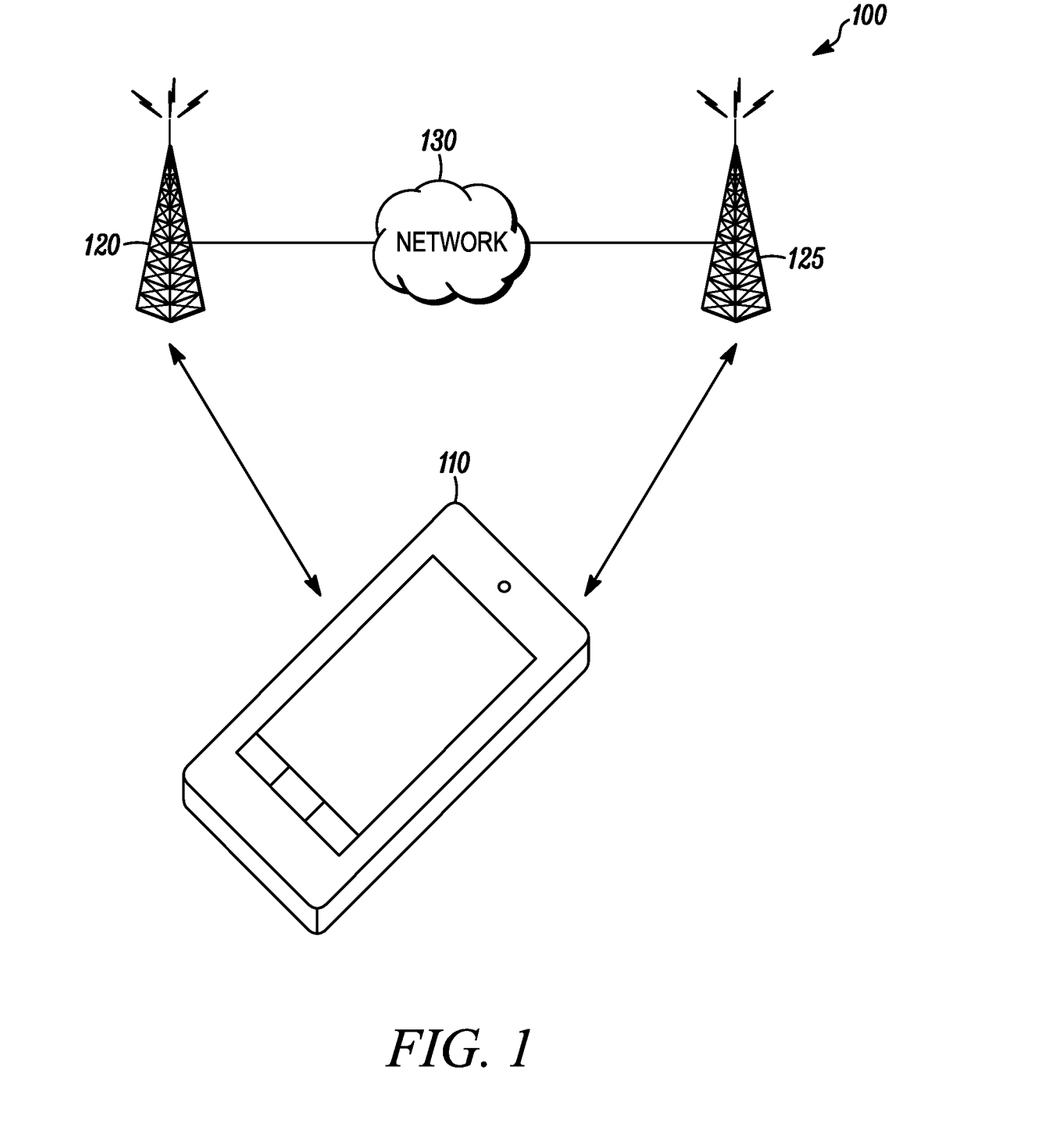
FIG. 1 is an example block diagram of a system according to a possible embodiment.

FIG. 1 is an example block diagram of a system 100 according to a possible embodiment. The system 100 can include a UE 110, at least one network entity 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be a wireless wide area network base station, can be a NodeB, can be an enhanced NodeB (eNB), can be a NR NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a satellite communications network, a high altitude platform network, the Internet, and/or other communications networks.

In operation, the UE 110 can communicate with the network 130 via at least one network entity 120. For example, the UE can send and receive control signals on a control channel and user data signals on a data channel.

Figure 2:
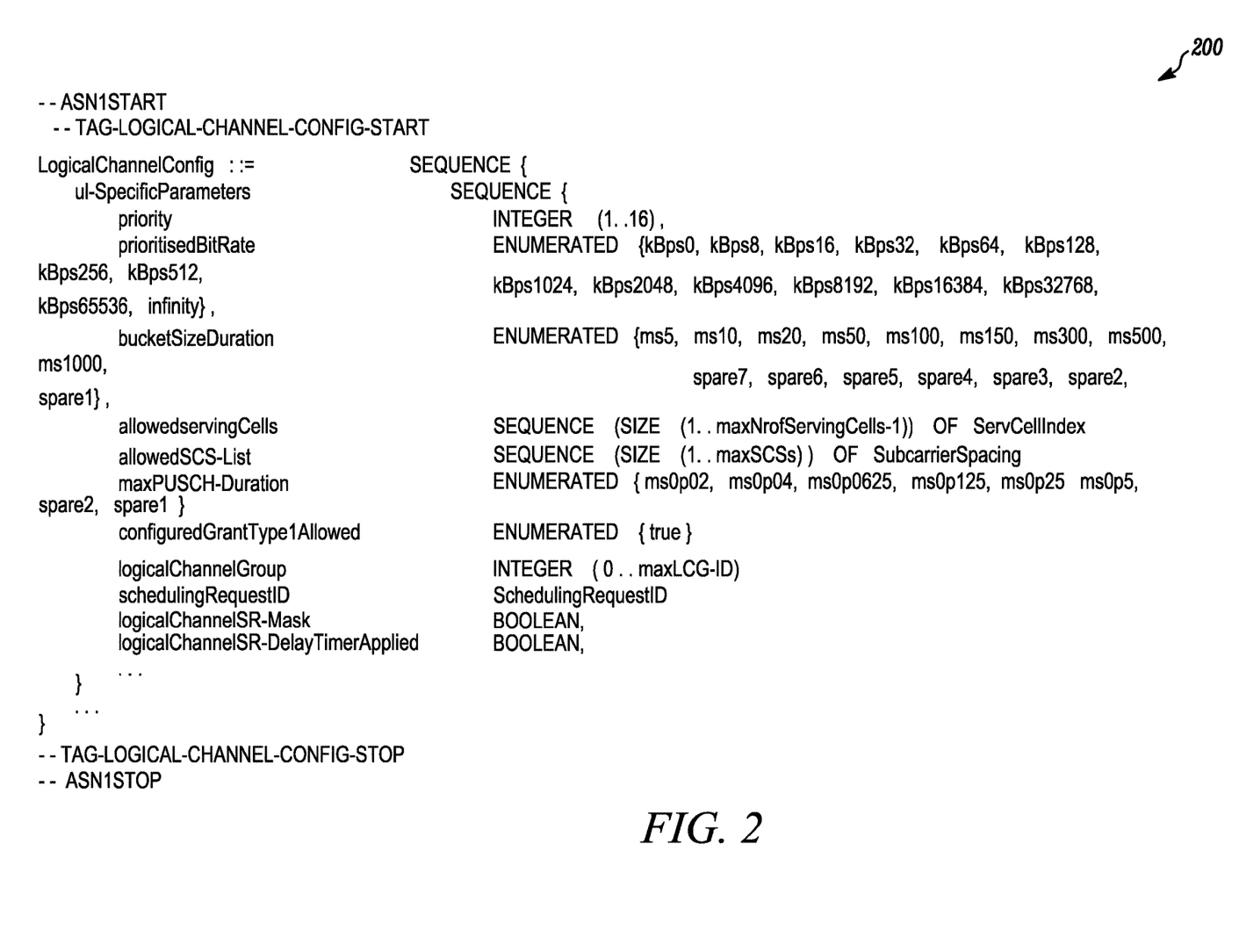
FIG. 2 is an example illustration of an LCH configuration Information Element (IE) according to a possible embodiment.

FIG. 2 is an example illustration of an LCH configuration IE 200 according to a possible embodiment. Using the LCH IE 200, such as a LogicalChannelConfig IE, higher layer signaling, such as signaling higher than physical layer signaling, can configure a set of allowed serving cells, allowedServingCells, that data of an LCH can be transmitted on.

At least some embodiments can provide solutions that allow a network to restrict the LCHs of a duplication radio bearer for which duplication is deactivated to certain cells without excessive signaling. Embodiments can use terminology to describe various messages and procedures as outlined in 3GPP LTE and NR specifications available at the time of filing.

According to a first possible embodiment when deactivating a DRB that is configured for duplication, a network entity 120, such as the network entity 120, can signal whether the cell restriction configuration, i.e. IE allowedServingCells, shall be also applied for the LCHs of the DRB after duplication has been deactivated.

Figure 3:
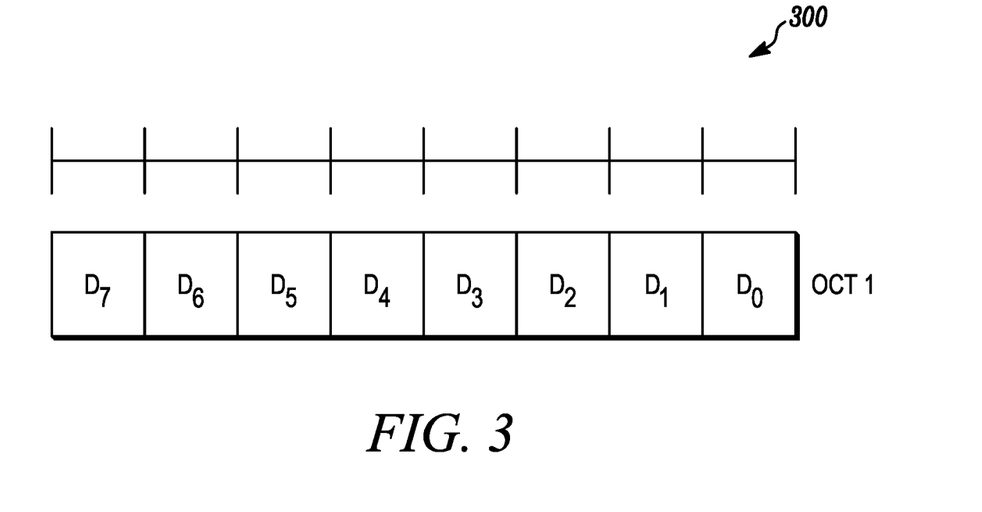
FIG. 3 is an example illustration of a Duplication Activation/Deactivation MAC CE according to a possible embodiment.

FIG. 3 is an example illustration of a Duplication Activation/Deactivation MAC CE 300 according to a possible embodiment. According to this variant of the first embodiment a new Duplication Activation/Deactivation MAC CE can be introduced that can be used to (i) indicate the activation/deactivation status of PDCP duplication of DRBs which are configured with PDCP duplication, and (ii) at the same time indicate that the cell restriction configuration, i.e. IE allowedServingCells, shall be also applied for the LCHs of a data radio bearer for which PDCP duplication has been deactivated. The format of this Duplication Activation/Deactivation MAC CE can be the same as the current defined Duplication Activation/Deactivation MAC CE specified in TS38.321. For example, this Duplication Activation/Deactivation MAC CE can have a fixed size and can consist of a single octet containing eight D-fields. This Duplication Activation/Deactivation MAC CE can be identified by one of the reserved LCH ID(s) that are currently not used.

For example, embodiments can be combined with TS 38.321, which can provide a Duplication Activation/Deactivation MAC CE of one octet identified by a MAC PDU subheader with an LCID as specified in Table 6.2.1-1, Values of LCID for DL-SCH, of TS 38.321. The Duplication Activation/Deactivation MAC CE can have a fixed size and consists of a single octet containing eight D-fields. The Duplication Activation/Deactivation MAC CE can be defined, for a MAC entity, as follows: $D_i$: This field can indicate the activation/deactivation status of the PDCP duplication of DRB i where i can be the ascending order of the DRB ID among the DRBs configured with PDCP duplication and with Radio Link Control (RLC) entity(ies) associated with this MAC entity. The $D_i$ field can be set to one to indicate that the PDCP duplication of DRB i shall be activated. The $D_i$ field can be set to zero to indicate that the PDCP duplication of DRB i shall be deactivated.

When the UE receives the new Duplication Activation/Deactivation MAC CE identified by the reserved LCID, it can deactivate duplication and keep applying cell restrictions, as configured by IE allowedServingCells in the LogicalChannelConfig IE, only for the LCH of the bearer for which the LogicalChannelIdentity is included as primaryPath (primary RLC entity/LCH) or alternatively for all the LCHs of the bearer. In cases when the UE receives the legacy Duplication Activation/Deactivation MAC CE, as specified in the current NR/LTE specification, the UE may cease applying cell restrictions until receiving another Activation/Deactivation MAC CE and the duplication for the corresponding bearer can simply be deactivated.

Figure 4:
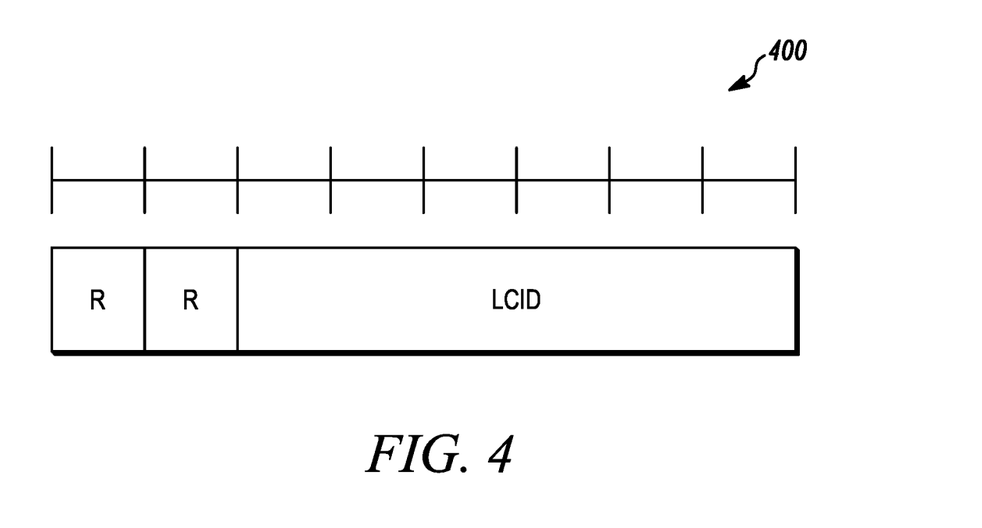
FIG. 4 is an example illustration of a R/LCH Identifier (LCID) MAC subheader according to a possible embodiment.

FIG. 4 is an example illustration of a R/LCID MAC subheader 400 according to a possible embodiment. According to this variant of the first embodiment, the MAC subheader identifying the Duplication/Activation MAC CE can indicate whether cell restriction configuration should be applied for LCHs of a radio bearer for which PDCP duplication is deactivated. The R/LCID MAC subheader 400 can show the MAC subheader used for the Duplication Activation/Deactivation MAC CE according to TS 38.321.

To achieve this according to a possible implementation, one of the reserved bits, an 'R' bit, in the MAC subheader 400 can be used to indicate whether cell restriction should be applied for a DRB for which PDCP duplication is deactivated. One of the 'R' bits can be used as, for example, a "cell restriction ('CR')" bit that, when set to '1', can indicate to apply cell restriction also for the case that PDCP duplication is deactivated, whereas the 'CR' bit set to '0' can order the UE to not apply the configured cell restriction for LCHs of a radio bearer for which PDCP duplication is deactivated, which can be a behavior according to NR specifications with R/R/LCID MAC subheader in absence of the 'CR' bit.

Figure 5:
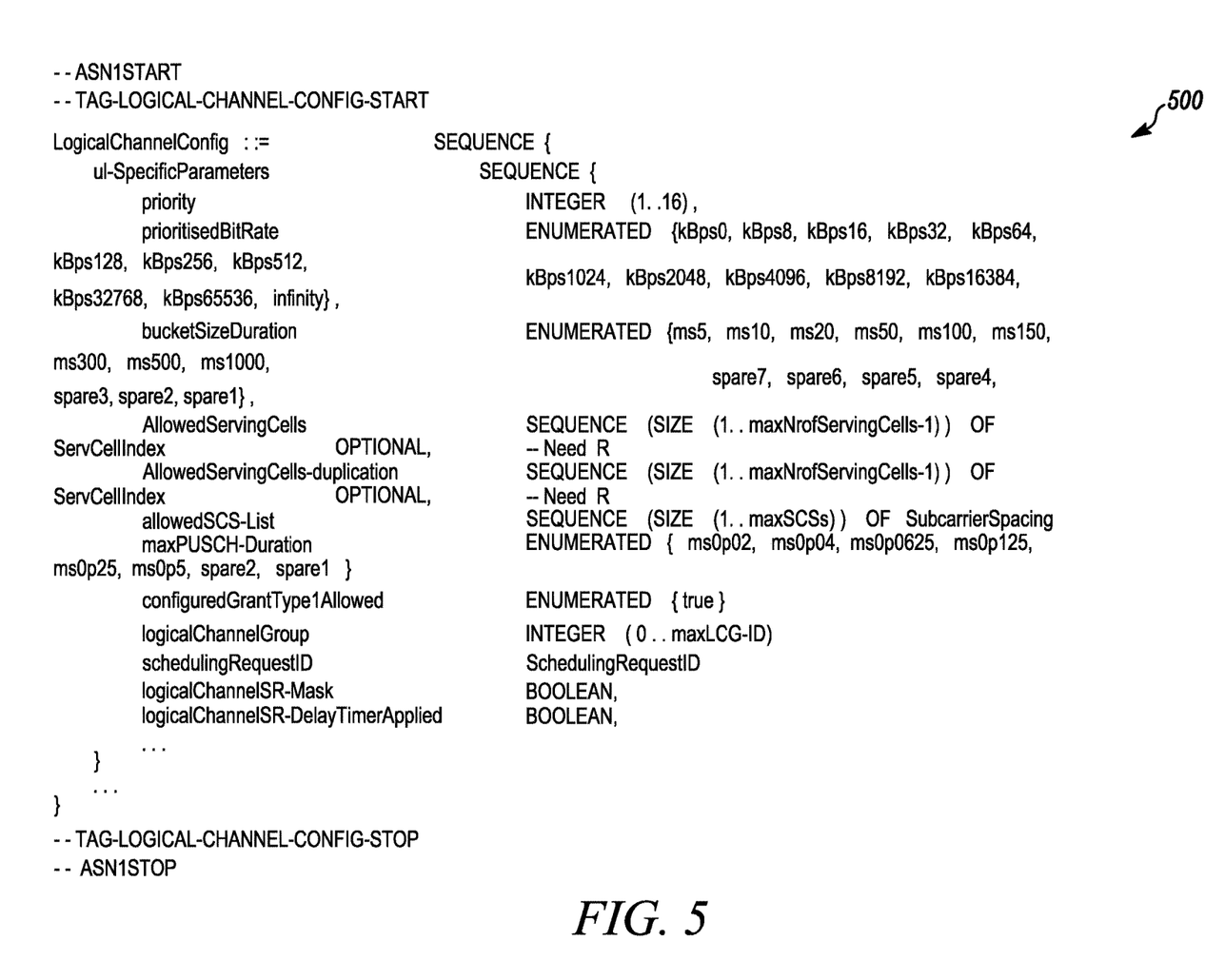
FIG. 5 is an example illustration of an LCH configuration IE according to a possible embodiment.

FIG. 5 is an example illustration of an LCH configuration IE 500 according to a possible embodiment. According to this second possible embodiment, a duplication deactivated allowed serving cells IE can be signaled within an RRC (re)configuration message. The duplication deactivated allowed serving cells IE can configure the cell restriction the UE shall apply for the LCHs of a radio bearer for which PDCP duplication is deactivated. This duplication deactivated allowed serving cells IE can be included in the LogicalChannelConfig IE as an allowedServingCells-duplication IE as shown in the LCH configuration IE 500 according to one variant of the second embodiment.

According to a possible implementation, the duplication deactivated allowed serving cells IE may only be present for a radio bearer that is configured for CA duplication, i.e. the radio bearer can have two associated RLC entities belonging to the same MAC entity. According to this embodiment, a radio bearer configured for duplication may have two cell restriction configurations. When duplication is activated the UE can be required to follow the cell restriction as configured by the IE allowedServingCells, which can be the current specified behavior. For cases when duplication is deactivated UE can be required to follow the cell restriction as configured by the duplication deactivated allowed serving cells IE, if present, e.g. allow edServingCell-duplication. This can allow the network to configure two different cell restrictions, such as one for the duplication case and the other one when duplication is deactivated.

According to a third possible embodiment, the UE can keep applying the configured cell restriction configured by IE allowedServingCells in the LogicalChannelConfig IE also for cases that PDCP duplication has been deactivated. According to this embodiment, the UE can stop duplicating PDCP PDUs for a radio bearer for which PDCP duplication has been deactivated but still apply the configured cell restriction for the LCHs associated with this radio bearer, at least for the "primary" LCH, i.e. the LCH configured as primaryPath. In Rel. 15, there can be only one "primary" LCH defined, but in future releases there may be more than one.

According to a possible implementation, the third embodiment may be realized in RRC. According to a first possible option, a Boolean or equivalent cell restriction continuation IE in the RRC configuration can explicitly indicate whether the cell restrictions continue even when the duplication for a bearer is deactivated. This can be implemented in a number of ways, such as by including 'continue-cellRestrictionafter-Duplication' in moreThanOneRLC inside of PDCP-config IE or inside of logicalchannelconfig IE but applicable only for the primaryPath.

Figure 6:
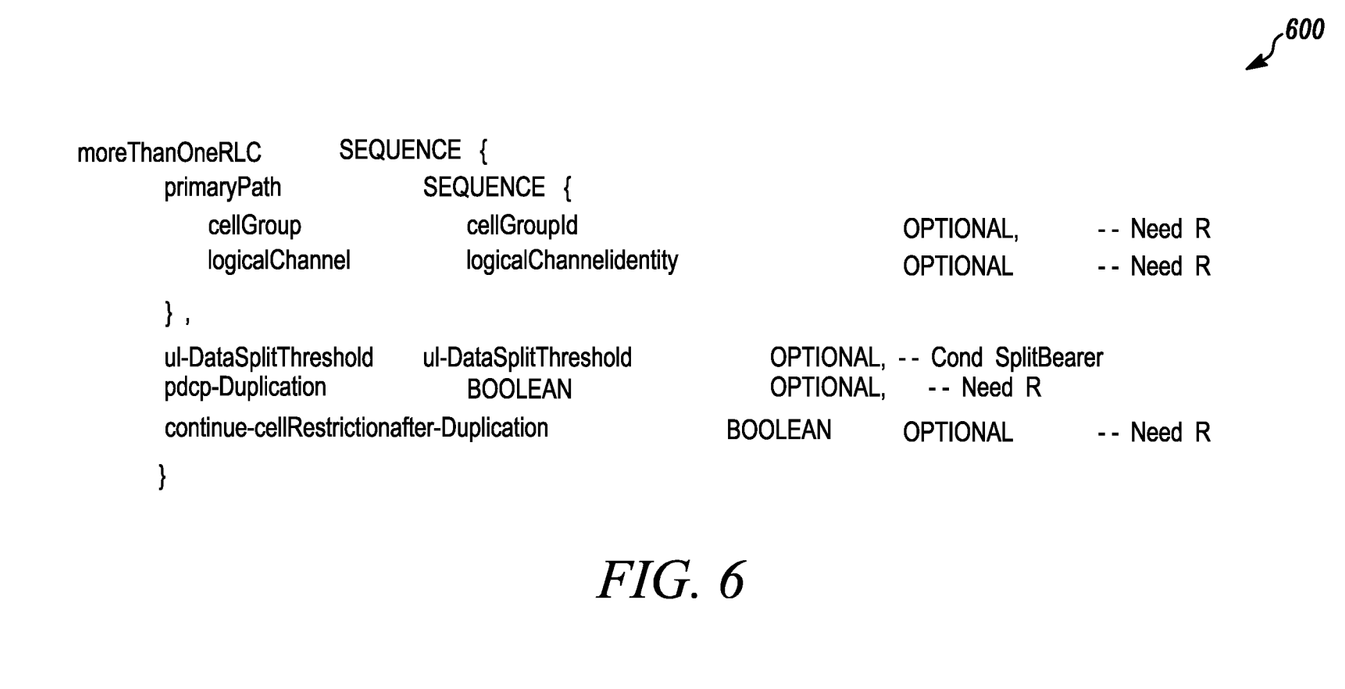
FIG. 6 is an example illustration of a moreThanOneRLC section for a PDCP-config IE according to a possible embodiment.

FIG. 6 is an example illustration of a moreThanOneRLC section 600 for a PDCP-config IE according to a possible embodiment. The moreThanOneRLC section 600 can include a continue-cellRestrictionafter-Duplication field that can indicate whether the cell restrictions continue even when the duplication for a bearer is deactivated.

According to a second possible option, a technical specification can specify that the cell restrictions can continue even when the duplication for a bearer is deactivated. For example, TS 38.331 and/or TS 38.321 can specify that the cell restrictions can continue even when the duplication for a bearer is deactivated.

According to another possible implementation, the third embodiment can be realized in MAC. For example, the MAC specification can specify that the UE can stop duplicating PDCP PDUs for a radio bearer for which PDCP duplication has been deactivated but still apply the configured cell restriction for the LCHs associated with this radio bearer. According to a first possible option, if continue-cellRestrictionafter-Duplication is set to TRUE in the MAC specification, instead of not applying the allowedServingCells the UE may apply the allowedServingCells to the LCHs of the DRB. For example, previously, the wording indicates to not apply the allowedServingCells to the logical channels of the DRB. According to this embodiment, the wording can state, 5.10 Activation/Deactivation of PDCP duplication
If one or more DRBs are configured with PDCP duplication, the network may activate and deactivate the PDCP duplication for the configured DRB(s).
The PDCP duplication for the configured DRB(s) is activated and deactivated by:
   receiving the Duplication Activation/Deactivation MAC CE described in subclause 6.1.3.11.
The MAC entity shall for each DRB configured with PDCP duplication:
1>if a Duplication Activation/Deactivation MAC CE is received activating the PDCP duplication of the DRB:
   2>indicate the activation of PDCP duplication of the DRB to upper layers;
   2>apply the allowedServingCells to the logical channels of the DRB.
1>if a Duplication Activation/Deactivation MAC CE is received deactivating the PDCP duplication of the DRB:
   2>indicate the deactivation of PDCP duplication of the DRB to upper layers;
   2>if continue-cellRestrictionafter-Duplication is set to TRUE
      3>-apply the allowedServingCells to the logical channels of the DRB.

As another example, the wording can state,
5.10 Activation/Deactivation of PDCP duplication
If one or more DRBs are configured with PDCP duplication, the network may activate and deactivate the PDCP duplication for the configured DRB(s).
The PDCP duplication for the configured DRB(s) is activated and deactivated by:
   receiving the Duplication Activation/Deactivation MAC CE described in subclause 6.1.3.11.
The MAC entity shall for each DRB configured with PDCP duplication:
1>if a Duplication Activation/Deactivation MAC CE is received activating the PDCP duplication of the DRB:
   2>indicate the activation of PDCP duplication of the DRB to upper layers;
   2>apply the allowedServingCells to the logical channels of the DRB.
1>if a Duplication Activation/Deactivation MAC CE is received deactivating the PDCP duplication of the DRB:
   2>indicate the deactivation of PDCP duplication of the DRB to upper layers;
   2>apply the allowedServingCells to the logical channels of the DRB.

Figure 7:
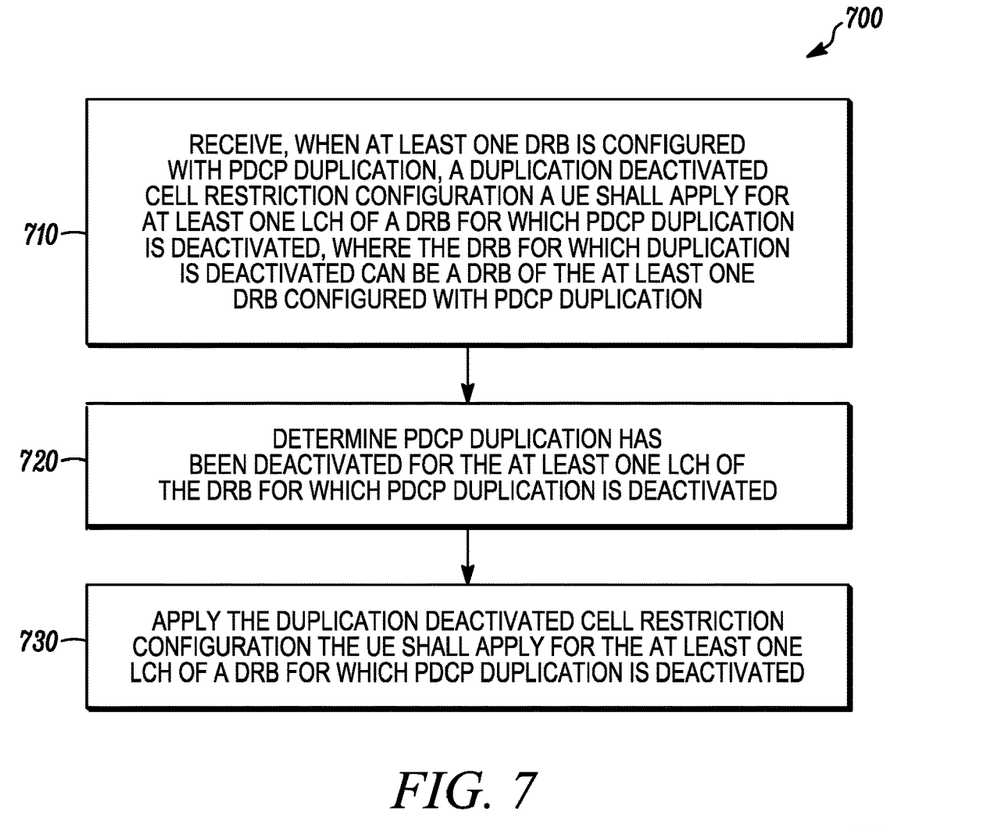
FIG. 7 is an example flowchart illustrating the operation of a wireless communication device according to a possible embodiment.

FIG. 7 is an example flowchart 700 illustrating the operation of a wireless communication device, such as the UE 110, according to a possible embodiment. At 710, a duplication deactivated cell restriction configuration can be received. The duplication deactivated cell restriction configuration can be received when at least one DRB is configured with PDCP duplication. DRB can be a service and data of a DRB can use different cells. The duplication deactivated cell restriction configuration can be a duplication deactivated cell restriction configuration a UE shall apply for at least one LCH of a DRB for which PDCP duplication is deactivated. The DRB for which duplication is deactivated can be a DRB of the at least one DRB configured with PDCP duplication. The at least one DRB can be configured with PDCP duplication by receiving a higher layer, such as a RRC, signal that configures the at least one DRB with PDCP duplication.

According to a possible implementation, a UE can have two restriction configurations and it can apply one restriction configuration when PDCP duplication is activated and another when PDCP duplication is deactivated. Even though the restriction configurations may be different, one restriction configuration may have the same allowed cells as the other restriction configuration.

At 720, a determination can be made that PDCP duplication has been deactivated for the at least one LCH of the DRB for which PDCP duplication is deactivated. According to a possible implementation, a duplication deactivation signal that indicates deactivation of PDCP duplication of the DRB can be received and the determination can be made that PDCP duplication has been deactivated based on the duplication deactivation signal.

At 730, the duplication deactivated cell restriction configuration the UE shall apply can be applied for the at least one LCH of a DRB for which PDCP duplication is deactivated. According to a possible implementation, the duplication deactivated cell restriction configuration can be applied in response to determining PDCP duplication has been deactivated. According to a related possible implementation, the duplication deactivated cell restriction configuration can be applied in response to receiving the duplication activation signal that indicates PDCP duplication has been deactivated.

According to a possible embodiment, a second cell restriction configuration can be received. According to a possible implementation, the second cell restriction configuration can be a cell restriction configuration the UE shall apply for at least one LCH of at least one DRB for which PDCP duplication is not configured. This second cell restriction configuration can be received instead of the duplication deactivated cell restriction configuration for a DRB for which PDCP duplication is not configured. The second cell restriction configuration the UE shall apply can be applied for at least one LCH of at least one DRB for which PDCP duplication is not configured.

According to another possible implementation, the second cell restriction configuration can be a cell restriction configuration the UE shall apply for at least one LCH of a DRB for which PDCP duplication activated. This second cell restriction configuration can be sent in a same message as the duplication deactivated cell restriction configuration or can be sent in a different message. The second cell restriction configuration the UE shall apply can be applied for at least one LCH of a DRB for which PDCP duplication activated.

According to a possible embodiment, receiving the duplication deactivated cell restriction configuration can include receiving a duplication deactivated cell restriction IE in an RRC configuration message. The RRC signal can be received when establishing or modifying a DRB. The duplication deactivated cell restriction IE can configure the duplication deactivated cell restriction configuration the UE shall apply for the at least one LCH of the DRB for which PDCP duplication is deactivated. According to a possible implementation, only one cell restriction IE may be received when duplication is not configured.

The RRC configuration message can include a second cell restriction IE that configures a second cell restriction configuration the UE shall apply for at least one LCH of a DRB for which PDCP duplication is activated. The cell restriction configuration can restrict at least one LCH to serving cells that are allowed for transmission. For example, the LCH can be restricted based on the allowed cells for transmission by instructing the UE to apply the allowed cells for transmission to the at least one LCH of the DRB, such as by instructing a UE to restrict the LCH of the DRB to the allowed cells. For example, the UE can apply configured cell restriction, allowedServingCells, to LCHs of the DRB by restricting the LCH of the DRB to the allowed cells. As a further example, the duplication deactivated cell restriction IE can be a first allowedServingCells IE and the second cell restriction IE can be a second allowedServingCells IE. For example, an allowedServingCells IE and an allowedServingCells-duplication IE can be sent in the same RRC message.

According to a possible embodiment, a duplication activation signal can be received. The duplication activation signal can indicate activation of PDCP duplication of a DRB of the at least one DRB that is configured with the PDCP duplication. The second cell restriction configuration the UE shall apply can be applied for at least one LCH of a DRB for which PDCP duplication is activated. The second cell restriction configuration can be applied in response to receiving the duplication activation signal.

Figure 8:
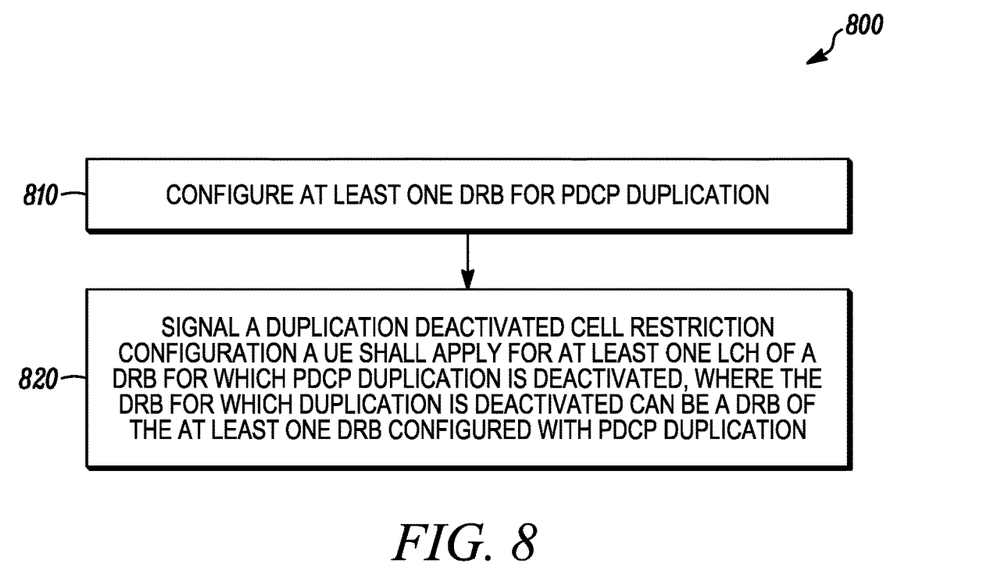
FIG. 8 is an example flowchart illustrating the operation of a wireless communication device according to a possible embodiment.

FIG. 8 is an example flowchart 800 illustrating the operation of a wireless communication device, such as the network entity 120, according to a possible embodiment. At 810, at least one DRB can be configured for PDCP duplication. The at least one DRB can be configured with PDCP duplication by sending a higher layer, such as an RRC, signal that configures the at least one DRB with PDCP duplication.

At 820, a duplication deactivated cell restriction configuration can be signaled. The duplication deactivated cell restriction configuration can be a duplication deactivated cell restriction configuration a UE shall apply for at least one LCH of a DRB for which PDCP duplication is deactivated. The DRB for which duplication is deactivated can be a DRB of the at least one DRB configured with PDCP duplication.

According to a possible embodiment, a duplication deactivation signal can be sent that indicates deactivation of PDCP duplication of the DRB. For example, a determination can be made that the DRB of the at least one DRB configured with PDCP duplication should be deactivated and duplication deactivation signal can be sent in response to determining the DRB of the at least one DRB configured with PDCP duplication should be deactivated. For example, a determination can be made as to whether channel conditions are good enough. If channel conditions are good enough, PDCP duplication can be turned off.

According to a possible embodiment a second cell restriction configuration can be signaled. According to a possible implementation, the second cell restriction configuration can be a cell restriction configuration the UE shall apply for at least one LCH of at least one DRB for which PDCP duplication is not configured. This second cell restriction configuration can be sent instead of the duplication deactivated cell restriction configuration for a DRB for which PDCP duplication is not configured. According to another possible implementation, the second cell restriction configuration can be a cell restriction configuration the UE shall apply for at least one LCH of a DRB for which PDCP duplication activated. This second cell restriction configuration can be sent in a same message as the duplication deactivated cell restriction configuration or can be sent in a different message.

According to a possible embodiment, signaling the duplication deactivated cell restriction configuration can include signaling a duplication deactivated cell restriction IE in an RRC configuration message. The duplication deactivated cell restriction IE can configure the duplication deactivated cell restriction configuration the UE shall apply for the at least one LCH of the DRB for which PDCP duplication is deactivated. According to a possible implementation, only one cell restriction IE may be sent when duplication is not configured. The RRC signal can be sent when establishing or modifying a DRB.

The RRC configuration message can include a second cell restriction IE that configures a second cell restriction configuration the UE shall apply for at least one LCH of a DRB for which PDCP duplication is activated. The cell restriction configuration can restrict at least one LCH to serving cells that are allowed for transmission. For example, the LCH can be restricted based on the allowed cells for transmission by instructing the UE to apply the allowed cells for transmission to the at least one LCH of the DRB, such as by instructing a UE to restrict the LCH of the DRB to the allowed cells. As a further example, the UE can apply a configured cell restriction, allowedServingCells, to LCHs of the DRB by restricting the LCH of the DRB to the allowed cells. The duplication deactivated cell restriction IE can be a first allowedServingCells IE and the second cell restriction IE can be a second allowedServingCells IE. For example, an allowedServingCells IE and an allowedServingCells-duplication IE can be sent in the same RRC message. A duplication activation signal can be sent that indicates activation of PDCP duplication of a DRB of the at least one DRB that is configured with the PDCP duplication.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
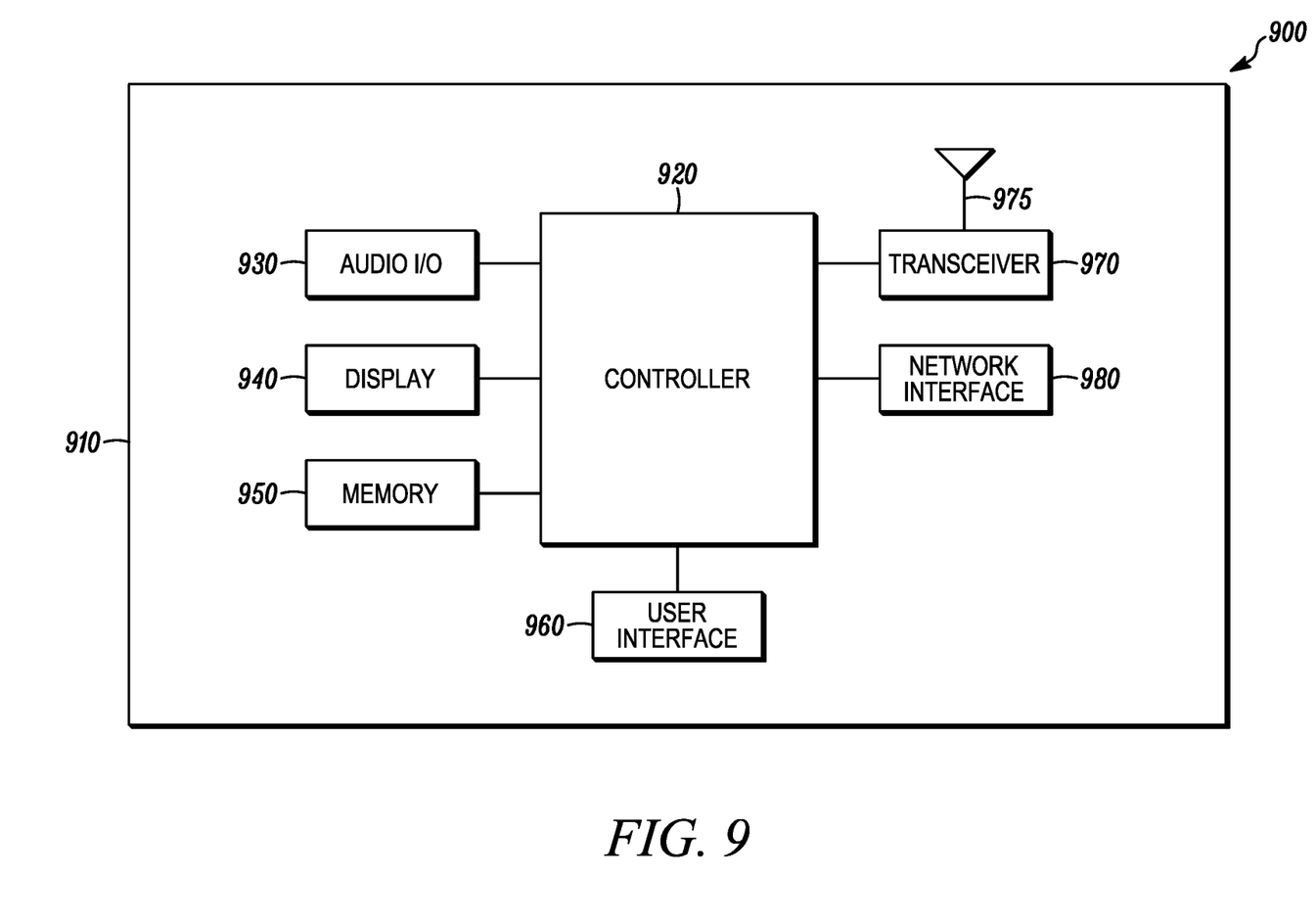
FIG. 9 is an example block diagram of an apparatus according to a possible embodiment.

FIG. 9 is an example block diagram of an apparatus 900, such as the UE 110, the network entity 120, or any other wireless communication device disclosed herein, according to a possible embodiment. The apparatus 900 can include a housing 910, a controller 920 coupled to the housing 910, audio input and output circuitry 930 coupled to the controller 920, a display 940 coupled to the controller 920, a memory 950 coupled to the controller 920, a user interface 960 coupled to the controller 920, a transceiver 970 coupled to the controller 920, at least one antenna 975 coupled to the transceiver 970, and a network interface 980 coupled to the controller 920. The apparatus 900 may not necessarily include all of the illustrated elements for different embodiments of the present disclosure. The apparatus 900 can perform the methods described in all the embodiments.

The display 940 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 970 can be one or more transceivers that can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 950 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 900 or the controller 920 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 950, elsewhere on the apparatus 900, in cloud storage, and/or anywhere else that can store software and/or an operating system. The apparatus 900 or the controller 920 may also use hardware to implement disclosed operations. For example, the controller 920 may be any programmable processor. Furthermore, the controller 920 may perform some or all of the disclosed operations. For example, some operations can be performed using cloud computing and the controller 920 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments. Some or all of the additional elements of the apparatus 900 can also perform some or all of the operations of the disclosed embodiments.

In operation, the apparatus 900 can perform the methods and operations of the disclosed embodiments. For example, the transceiver 970 can transmit and receive signals, including control signals and data signals and including information, such as control and data information. The controller 920 can generate and process the transmitted and received signals and information.

In operation as a UE, the transceiver 970 can receive a duplication deactivated cell restriction configuration the apparatus 900 shall apply for at least one LCH of a DRB for which PDCP duplication is deactivated. The transceiver 970 can receive the duplication deactivated cell restriction configuration when at least one DRB is configured with PDCP duplication. The DRB for which duplication is deactivated can be a DRB of the at least one DRB configured with PDCP duplication. The controller 920 can apply the duplication deactivated cell restriction configuration the apparatus 900 shall apply for the at least one LCH of a DRB for which PDCP duplication is deactivated.

According to a possible implementation, the controller 920 can determine PDCP duplication has been deactivated for the at least one LCH of the DRB for which PDCP duplication is deactivated. The controller 920 can apply the duplication deactivated cell restriction configuration in response to determining PDCP duplication has been deactivated.

According to a possible implementation, the transceiver 970 can receive a duplication deactivation signal that indicates deactivation of PDCP duplication of the DRB. The controller 920 can apply the duplication deactivated cell restriction configuration in response to receiving the duplication activation signal that indicates PDCP duplication has been deactivated.

According to a possible embodiment, the transceiver 970 can receive a second cell restriction configuration the apparatus 900 shall apply for at least one LCH of at least one DRB for which PDCP duplication is not configured. The controller 920 can apply the second cell restriction configuration the apparatus 900 shall apply for at least one LCH of at least one DRB for which PDCP duplication is not configured.

According to another possible embodiment, the transceiver 920 can receive a second cell restriction configuration the apparatus 900 shall apply for at least one LCH of a DRB for which PDCP duplication activated. The controller 920 can apply the second cell restriction configuration the apparatus 900 shall apply for at least one LCH of a DRB for which PDCP duplication activated.

According to another possible embodiment, the transceiver 970 can receive the duplication deactivated cell restriction configuration by receiving a duplication deactivated cell restriction IE in an RRC configuration message. The duplication deactivated cell restriction IE can configure the duplication deactivated cell restriction configuration the apparatus 900 shall apply for the at least one LCH of the DRB for which PDCP duplication is deactivated.

According to a possible implementation, the RRC configuration message can include a second cell restriction IE that configures a second cell restriction configuration the apparatus 900 shall apply for at least one LCH of a DRB for which PDCP duplication is activated. According to a possible option, the duplication deactivated cell restriction IE can be a first allowedServingCells IE and the second cell restriction IE can be a second allowedServingCells IE. According to another possible option, the transceiver 970 can receive a duplication activation signal that indicates activation of PDCP duplication of a DRB of the at least one DRB that is configured with the PDCP duplication and the controller 920 can apply, in response to receiving the duplication activation signal, the second cell restriction configuration the apparatus 900 shall apply for at least one LCH of a DRB for which PDCP duplication is activated.

In operation as a network entity, the controller 920 can configure at least one DRB for PDCP duplication. The transceiver 970 can send a duplication deactivation signal that indicates deactivation of PDCP duplication of the DRB. The transceiver 970 can alternately send a duplication activation signal that indicates activation of PDCP duplication of a DRB of the at least one DRB that is configured with the PDCP duplication. The transceiver 970 can signal a duplication deactivated cell restriction configuration a UE shall apply for at least one LCH of a DRB for which PDCP duplication is deactivated. The DRB for which duplication is deactivated can be a DRB of the at least one DRB configured with PDCP duplication.

According to a possible embodiment, the controller 920 can determine the DRB of the at least one DRB configured with PDCP duplication should be deactivated. The transceiver 970 can send the duplication deactivation signal in response to determining the DRB of the at least one DRB configured with PDCP duplication should be deactivated.

According to a possible embodiment, the transceiver 970 can signal a second cell restriction configuration the UE shall apply for at least one LCH of at least one DRB for which PDCP duplication is not configured. According to another possible embodiment, the transceiver 970 can signal a different second cell restriction configuration the UE shall apply for at least one LCH of a DRB for which PDCP duplication activated.

According to a possible embodiment, the transceiver 970 can signal the duplication deactivated cell restriction configuration by signaling a duplication deactivated cell restriction IE in an RRC configuration message. The duplication deactivated cell restriction IE can configure the duplication deactivated cell restriction configuration the UE shall apply for the at least one LCH of the DRB for which PDCP duplication is deactivated.

According to a possible implementation, the RRC configuration message can include a second cell restriction IE that can configure a second cell restriction configuration the UE shall apply for at least one LCH of a DRB for which PDCP duplication is activated. The cell restriction configuration can restrict at least one LCH to serving cells that are allowed for transmission. For example, the LCH can be restricted based on the allowed cells for transmission by instructing the UE to apply the allowed cells for transmission to the at least one LCH of the DRB, such as by instructing a UE to restrict the LCH of the DRB to the allowed cells. For example, the UE can apply configured cell restriction, allowedServingCells, to LCHs of the DRB by restricting the LCH of the DRB to the allowed cells.

According to a possible implementation, the duplication deactivated cell restriction IE can be a first allowedServingCells IE. The second cell restriction IE can be a second allowedServingCells IE. For example, an allowedServingCells IE and an allowedServingCells-duplication IE can be sent in the same RRC message.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
receiving, at the user equipment when at least one data radio bearer is configured with packet data convergence protocol duplication, a medium access control control element including a medium access control control element subheader that includes a cell restriction configuration indicator bit that indicates whether an existing allowedServingCells cell restriction configuration should be applied for logical channels of a radio bearer for which packet data convergence protocol duplication is deactivated, where the medium access control control element includes a duplication deactivated cell restriction configuration the user equipment shall apply for at least one logical channel of a data radio bearer for which packet data convergence protocol duplication is deactivated,
where the data radio bearer for which duplication is deactivated comprises a data radio bearer of the at least one data radio bearer configured with packet data convergence protocol duplication; and
applying the duplication deactivated cell restriction configuration the user equipment shall apply for the at least one logical channel of a data radio bearer for which packet data convergence protocol duplication is deactivated.

2. The method according to claim 1, further comprising determining packet data convergence protocol duplication has been deactivated for the at least one logical channel of the data radio bearer for which packet data convergence protocol duplication is deactivated,
wherein applying comprises applying the duplication deactivated cell restriction configuration in response to determining packet data convergence protocol duplication has been deactivated.

3. The method according to claim 1, further comprising receiving a duplication deactivation signal that indicates deactivation of packet data convergence protocol duplication of the data radio bearer,
- wherein applying comprises applying the duplication deactivated cell restriction configuration in response to receiving the duplication deactivation signal that indicates packet data convergence protocol duplication has been deactivated.

4. The method according to claim 1, further comprising:
- receiving a second cell restriction configuration the user equipment shall apply for at least one logical channel of at least one data radio bearer for which packet data convergence protocol duplication is not configured, and
- applying the second cell restriction configuration the user equipment shall apply for at least one logical channel of at least one data radio bearer for which packet data convergence protocol duplication is not configured.

5. The method according to claim 1, further comprising:
- receiving a second cell restriction configuration the user equipment shall apply for at least one logical channel of a data radio bearer for which packet data convergence protocol duplication is activated; and
- applying the second cell restriction configuration the user equipment shall apply for at least one logical channel of a data radio bearer for which packet data convergence protocol duplication is activated.

6. The method according to claim 1, wherein receiving the duplication deactivated cell restriction configuration comprises receiving a duplication deactivated cell restriction information element in an radio resource control configuration message, where the duplication deactivated cell restriction information element configures the duplication deactivated cell restriction configuration the user equipment shall apply for the at least one logical channel of the data radio bearer for which packet data convergence protocol duplication is deactivated.

7. The method according to claim 6, wherein the radio resource control configuration message includes a second cell restriction information element that configures a second cell restriction configuration the user equipment shall apply for at least one logical channel of a data radio bearer for which packet data convergence protocol duplication is activated.

8. The method according to claim 7,
- wherein the duplication deactivated cell restriction information element comprises a first allowedServingCells information element, and
- wherein the second cell restriction information element comprises a second allowedServingCells information element.

9. The method according to claim 7, further comprising:
- receiving a duplication activation signal that indicates activation of packet data convergence protocol duplication of a data radio bearer of the at least one data radio bearer that is configured with the packet data convergence protocol duplication, and
- applying, in response to receiving the duplication activation signal, the second cell restriction configuration the user equipment shall apply for at least one logical channel of a data radio bearer for which packet data convergence protocol duplication is activated.

10. An apparatus comprising:
- a transceiver that receives, when at least one data radio bearer is configured with packet data convergence protocol duplication, a medium access control control element including a medium access control control element subheader that includes a cell restriction configuration indicator bit that indicates whether an existing allowedServingCells cell restriction configuration should be applied for logical channels of a radio bearer for which packet data convergence protocol duplication is deactivated, where the medium access control control element includes a duplication deactivated cell restriction configuration the apparatus shall apply for at least one logical channel of a data radio bearer for which packet data convergence protocol duplication is deactivated,
  - where the data radio bearer for which duplication is deactivated comprises a data radio bearer of the at least one data radio bearer configured with packet data convergence protocol duplication; and
- a controller that applies the duplication deactivated cell restriction configuration the apparatus shall apply for the at least one logical channel of a data radio bearer for which packet data convergence protocol duplication is deactivated.

11. The apparatus according to claim 10,
- wherein the controller determines packet data convergence protocol duplication has been deactivated for the at least one logical channel of the data radio bearer for which packet data convergence protocol duplication is deactivated, and
- wherein the controller applies the duplication deactivated cell restriction configuration in response to determining packet data convergence protocol duplication has been deactivated.

12. The apparatus according to claim 10,
- wherein the transceiver receives a duplication deactivation signal that indicates deactivation of packet data convergence protocol duplication of the data radio bearer, and
- wherein the controller applies the duplication deactivated cell restriction configuration in response to receiving the duplication deactivation signal that indicates packet data convergence protocol duplication has been deactivated.

13. The apparatus according to claim 10,
- wherein the transceiver receives a second cell restriction configuration the apparatus shall apply for at least one logical channel of at least one data radio bearer for which packet data convergence protocol duplication is not configured, and
- wherein the controller applies the second cell restriction configuration the apparatus shall apply for at least one logical channel of at least one data radio bearer for which packet data convergence protocol duplication is not configured.

14. The apparatus according to claim 10,
- wherein the transceiver receives a second cell restriction configuration the apparatus shall apply for at least one logical channel of a data radio bearer for which packet data convergence protocol duplication is activated, and
- wherein the controller applies the second cell restriction configuration the user equipment shall apply for at least one logical channel of a data radio bearer for which packet data convergence protocol duplication is activated.

15. The apparatus according to claim 10, wherein the transceiver receives the duplication deactivated cell restriction configuration by receiving a duplication deactivated cell restriction information element in an radio resource control configuration message, where the duplication deactivated cell restriction information element configures the duplication deactivated cell restriction configuration the apparatus shall apply for the at least one logical channel of the data radio bearer for which packet data convergence protocol duplication is deactivated.

16. The apparatus according to claim 15, wherein the radio resource control configuration message includes a second cell restriction information element that configures a second cell restriction configuration the apparatus shall apply for at least one logical channel of a data radio bearer for which packet data convergence protocol duplication is activated.

17. The apparatus according to claim 16,
wherein the duplication deactivated cell restriction information element comprises a first allowedServingCells information element, and
wherein the second cell restriction information element comprises a second allowedServingCells information element.

18. The apparatus according to claim 16,
wherein the transceiver receives a duplication activation signal that indicates activation of packet data convergence protocol duplication of a data radio bearer of the at least one data radio bearer that is configured with the packet data convergence protocol duplication, and
wherein the controller applies, in response to receiving the duplication activation signal, the second cell restriction configuration the apparatus shall apply for at least one logical channel of a data radio bearer for which packet data convergence protocol duplication is activated.

* * * * *